United States Patent [19]

Gulick

[11] 4,391,093
[45] Jul. 5, 1983

[54] TEMPERATURE-RESPONSIVE ACTUATOR

[75] Inventor: William K. Gulick, Glendale, Ohio

[73] Assignee: General Electric Company, Cincinnati, Ohio

[21] Appl. No.: 278,922

[22] Filed: Jun. 29, 1981

[51] Int. Cl.³ ............................................. F02C 7/042
[52] U.S. Cl. ...................................... 60/39.29; 60/527
[58] Field of Search .................... 60/39.27, 39.29, 527, 60/529; 415/150; 137/457, 468; 337/394, 397

[56] References Cited

U.S. PATENT DOCUMENTS

| 2,373,324 | 4/1945 | Martin | 60/527 |
| 2,494,660 | 1/1950 | Kathe | 60/527 |
| 3,377,799 | 4/1968 | Geyer | 60/39.29 |
| 3,628,329 | 12/1971 | Spencer | 60/39.29 |

Primary Examiner—Louis J. Casaregola

Attorney, Agent, or Firm—Francis L. Conte; Derek P. Lawrence

[57] ABSTRACT

The invention comprises an actuator for positioning a controllable element and having first and second thermally expandable members, the first member is fixedly connected at one end to a supporting member and at the other end to one end of the second member. Means are provided for directing a flow of fluid in contact with both expandable members. Means for restricting the flow of fluid in contact with one of the members in a first mode of operation are provided and are effective for increasing the initial relative differential thermal expansion between the two members. The means also enables relatively unrestricted flow of the fluid in a second mode of operation for decreasing the relative differential thermal expansion. Thusly, the response and the compensation capability of the actuator are enhanced.

8 Claims, 4 Drawing Figures

U.S. Patent  Jul. 5, 1983  4,391,093
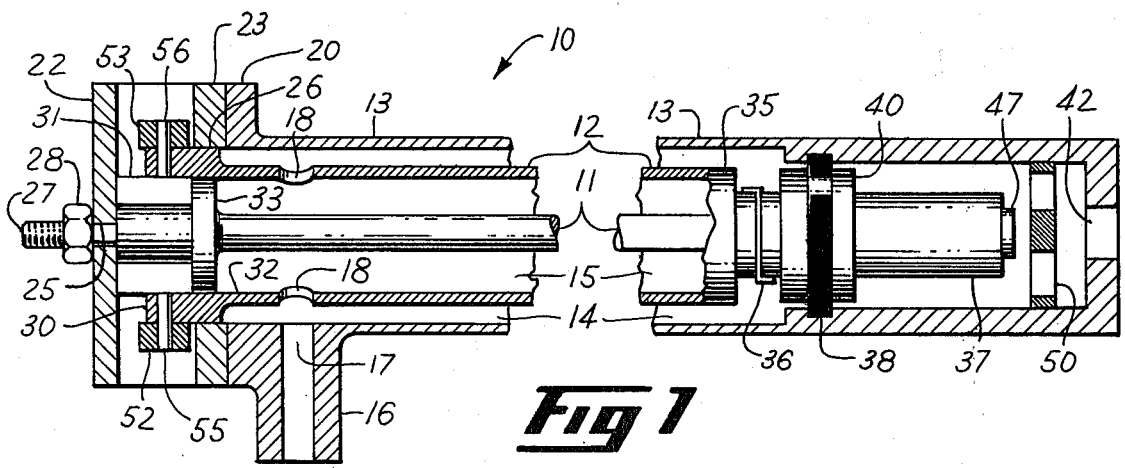
*Fig 1*
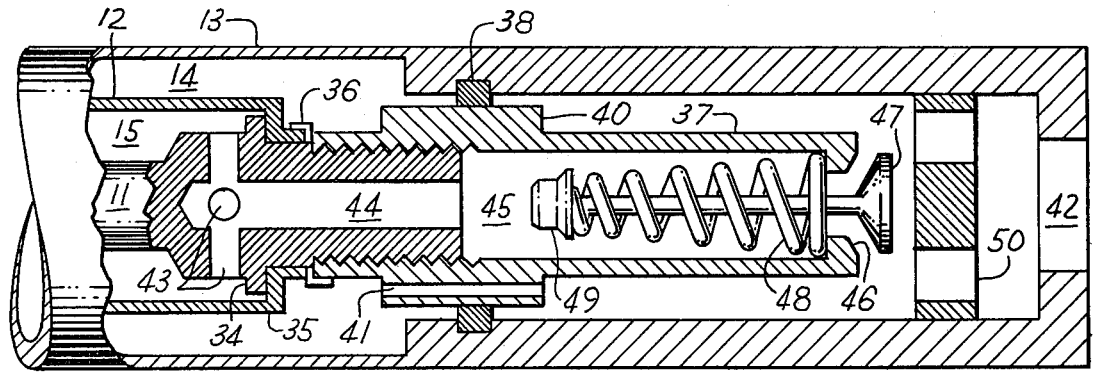
*Fig 2*
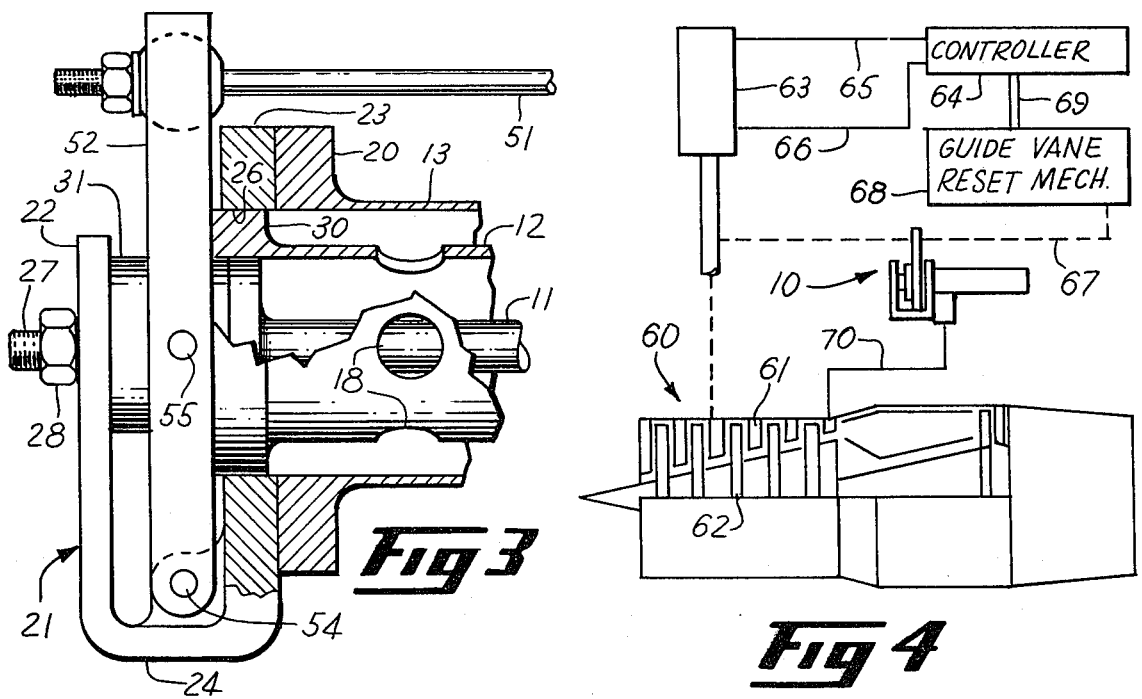
*Fig 3*
*Fig 4*

TEMPERATURE-RESPONSIVE ACTUATOR

BACKGROUND OF THE INVENTION

This invention relates generally to actuators and, more particularly, to an actuator which provides a predetermined time delay before automatically resetting a controlled member back to an initial position from which it has been previously displaced by the actuator.

It is a common goal in the design, for example, of high performance gas turbine engines to provide for optimization of the performance of axial flow compressors therein under various operating conditions. One method of achieving this end is to provide compressors with a series of variable angle stator or guide vanes. During normal engine operation, the angle of these vanes is adjusted according to a predetermined schedule, in accordance with speed, thrust, or other engine operating parameters, to optimize the compressor performance.

In addition to optimizing compressor performance, the opening of the variable angle stator vanes may be utilized to control various engine operating parameters such as turbine inlet temperature downstream of the compressor, exhaust gas temperature, and fan speed. More specifically, and for example, it is generally desirable to control the angular orientation of the variable angle stator vanes during engine acceleration and thrust output buildup. The normal manner of increasing thrust output of a gas turbine engine is to increase the amount of fuel delivered to the combustion system. The high fuel flow required to accelerate the engine results in an increase in combustion burner pressure. This, in turn, decreases the air flow at the rear of the compressor and can result in a choking-stall condition of the stator vanes whereby air flow thereover becomes turbulent resulting in reduced air flow and a reduction in compression ratio and, accordingly, a loss in engine performance.

In order to avoid the above-mentioned adverse condition, the angular orientation of the stator vanes can be adjusted. If the angular orientation is not adjusted, upon reaching a desired engine speed the temperature of the gas entering the turbine can exceed the turbine design limit and can result in an appreciable decrease in turbine engine life. This turbine overtemperature problem can be minimized by adjusting the angular orientation for reducing or closing the variable angle stator vanes. The turbine overtemperature, however, normally lasts for only a short period of time, e.g., approximately 30 seconds. It is desirable, therefore, to provide an actuator which can adjust the stator vanes for this short period of time and thereafter automatically reschedule the position of the vanes to their normal positions.

One actuator effective for scheduling the angular position of stator and guide vanes is disclosed in U.S. Pat. No. 3,628,329—Spencer, assigned to the present assignee. This patent, incorporated herein by reference, discloses an engine-temperature responsive actuator effective for positioning a controlled member to generate a correction signal for adjusting the variable angle stator vanes during engine temperature transient conditions, which correction signal becomes substantially zero upon return of the actuator to a null condition which occurs upon engine temperature stabilization.

The actuator comprises a solid rod member positioned coaxially within and spaced from a perforated sleeve member and fixedly connected to each other at corresponding ends thereof. In operation, compressor interstage hot air is directed into contact with and heats the rod and sleeve members causing both members to expand thermally at different rates. During transient changes of compressor interstage air temperature, a relative differential thermal expension exists between the rod and sleeve. This difference in expansion is utilized for positioning the controlled member for predeterminedly positioning the variable stator vanes. After elapse of a finite time period, the temperatures of the rod and sleeve members become equal and the differential expansion becomes substantially zero which thereby automatically reschedules the position of the vanes to a normal position.

The actuator of Spencer can also be used to compensate for engine thermal transient characteristics which, if not provided for, can result in fan speed overshoot or undershoot and exhaust gas temperature overshoot after a new fan speed has been set at the engine control panel. More specifically, during operation of the gas turbine engine, the throttle is set to a desired fan speed from a lower fan speed setting, such as at idle, and the engine is then caused to accelerate. Due to inherent engine thermal characteristics, the actual fan speed, for example, can initially overshoot the desired speed setting and after a relatively short time period also undershoot the desired speed setting. These overshoot and undershoot speed errors can result in a decrease in engine life due to engine overtemperature therefrom and can prevent the thrust output of the engine from meeting the expected output at a given throttle setting. The latter consideration can be important where the engine powers an aircraft and a take-off thrust output must be accurately maintained. The actuator of Spencer is effective to compensate for these speed errors; and the present invention represents an improvement thereover by providing for enhanced time response and compensation for speed or temperature errors, especially initial overshoot errors.

SUMMARY OF THE INVENTION

Accordingly, it is one object of the present invention to provide a new and improved actuator having increased time-response characteristics.

Another object of the present invention is to provide a new and improved actuator which, after sensing temperature, positions an element accordingly, and thereafter repositions the element in its original position after a predetermined time interval.

Another object of the present invention is to provide a new and improved actuator particularly effective for resetting aircraft gas turbine engine stator vanes in response to compressor air temperature and thereafter repositioning the stator vanes in their original position after a predetermined time interval.

Briefly stated, the invention comprises an actuator for positioning a controllable element and having first and second thermally expandable members, the first member is fixedly connected at one end to a supporting member and at another end to one end of the second member. Means are provided for directing a flow of fluid in contact with both expandable members. Means for restricting the flow of fluid in contact with one of the members in a first mode of operation are provided and are effective for increasing the initial relative differential thermal expansion between the two members. The means also enables relatively unrestricted flow of the fluid in a second mode of operation for decreasing the relative differential thermal expansion. Thusly, time response and the compensation capability of the actuator are enhanced.

DESCRIPTION OF THE DRAWING

The invention together with further objects and advantages thereof is more particularly described in the following detailed description taken in conjunction with the accompanying drawing, in which:

FIG. 1 is a fragmentary side view, partly in section, of an actuator constructed in accordance with this invention.

FIG. 2 is an enlarged fragmentary side view of the outlet end of the actuator of FIG. 1.

FIG. 3 is a fragmentary side view of the actuating end of the actuator of FIG. 1.

FIG. 4 is a schematic showing a gas turbine engine inlet guide vane control system embodying the present invention.

DETAILED DESCRIPTION

An actuator constructed in accordance with applicant's invention is shown in the figures and is generally designated 10. The actuator 10 comprises an elongated central member such as solid rod 11, which is surrounded by an inner casing such as a hollow cylindrical sleeve 12. The rod 11 and the sleeve 12 are, in turn, surrounded by an outer casing or housing such as a hollow cylindrical thermal shield 13. Thermal shield 13 and sleeve 12 define an annular outer flow passage 14 for a primary fluid flow therein and sleeve 12 and rod 11 define an annular inner flow passage 15 for a secondary fluid flow therein.

The thermal shield 13 includes a fitting 16 located at one end thereof which cooperates with a radial inlet 17 to provide an opening for the passage of fluid such as hot air to the interior and the outer passage 14 of the actuator 10. Sleeve 12 is imperforate except for a plurality of circumferentially spaced inlet apertures 18 immediately adjacent the inlet 17 for the passage of a portion of the air from the inlet 17 to the inner passage 15.

As better seen in FIG. 3, thermal shield 13 is provided with a flange 20 to which a U-shaped bracket 21 is suitably secured. The U-shaped bracket 21 includes a pair of parallel legs 22 and 23 and an interconnecting bight portion 24. The legs 22 and 23 are provided with openings 25 and 26, respectively, shown in FIG. 1 and located approximately midway along their lengths to redeive a free end of the rod 11. The free end of the rod 11 extends freely through openings 25 and 26 in legs 22 and 23, respectively, and is secured to leg 22 by means of threaded portion 27 and a nut 28. The opening 26 in the leg 23 is sized to additionally receive a cylindrical, flanged end 30 of the sleeve 12 in suitable sealing and sliding cooperation therewith.

Shown also in FIG. 1 is a bearing and seal arrangement 31 mounted on the rod 11 between the inner surface 32 of the flanged end 30 of the sleeve 12 and the exterior surface of the rod 11. The bearing and seal 31 is restrained from axial movement along the rod 11 by means of a flange 33 thereon and by engagement with the leg portion 22 of the bracket 24. The bearing and seal 31 is dimensioned to slidingly engage the inner surface 32 of the flange end 30 to permit relative movement of the rod 11 and sleeve 12 while preventing fluid leakage from the actuator 10.

Referring still to FIG. 1, the right-hand ends of the rod 11 and sleeve 12 are rigidly interconnected and restrained from separate movement and are sized to fit within the thermal shield 13 in longitudinal sliding relationship therein.

Referring to FIG. 2, the outlet end of actuator 10 is shown in more detail. More specifically, rod 11 is provided with a flanged end portion 34 which sealingly mates with a flanged end portion 35 of sleeve 12. An annular metal tab washer 36 is coaxially disposed about rod 11 and is situated between flanged end portion 35 and one end of a hollow cylindrical valve assembly housing 37. Housing 37 threadingly engages end portion 34 of rod 11 and presses the tab washer 36 against the flanged end portion 35 of sleeve 12, which portion 35 in turn presses against flanged end portion 34 of rod 11 thereby providing a rigid interconnection and a sealed fit. The sealed fit prevents leakage of the secondary fluid flow from the inner passage 15.

Valve housing 37, which rigidly interconnects respective ends of rod 11 and sleeve 12, is slidably mounted coaxially and radially spaced in outer casing 13 for allowing axial movement of rod 11 and sleeve 12. This is accomplished by utilizing an annular seal 38 fixedly mounted in the inner surface of outer casing 13 and sealingly engaging an annular flange portion 40 of valve housing 37 intermediately positioned between opposite ends thereof. Seal 38 prevents leakage of primary fluid flow from the outer passage 14.

A plurality of predeterminedly sized, circumferentially spaced, and axially extending orifices 41 (only one of which is shown in FIG. 2) are located in flange portion 40 of valve housing 37 for providing a controlled outlet for the primary fluid flow through an axial outlet 42 of the actuator 10 and from the outer passage 14. Controlling the primary fluid flow through outer passage 14 is one manner of controlling the amount of heat transferred to sleeve 12 for thereby determining the temperature and scheduling the rate of expansion thereof. The more quickly sleeve 12 expands longitudinally, the faster will be the time response in operation of actuator 10 discussed in detail hereinafter. Accordingly, additional orifices (not shown) can be provided in thermal shield 13 for further increasing the primary fluid flow for thereby additionally increasing the time response of actuator 10 if desired.

Two perpendicularly intersecting radially extending apertures 43 are provided in the flanged end of rod 11 and communicate with an axially extending aperture 44 therein for providing an outlet for the secondary fluid flow from the inner passage 15. Apertures 43 and 44 define a passage for directing fluid from inner passage 15 into a cylindrical cavity 45 of the valve housing 37 which housing 37 has a valve seat 46 which defines an axial outlet aperture for the passage of secondary fluid flow from cavity 45 and inner passage 15.

Positioned within cavity 45 is a poppet-valve assembly comprising a valve 47 (shown in a partly open position for illustrative purpose), coil spring 48 and nut 49. Valve 47 has a head portion at one end thereof located outside housing 37 for cooperating with valve seat 46, and a stem portion extending longitudinally from the head portion and into cavity 45. The coil spring 48 of the poppet-valve assembly is positioned over the stem portion of valve 47 and between the backside of seat 46 and nut 49, which nut 49 threadingly engages the stem of valve 47 for compressing spring 48 and thus urging the head portion thereof toward a closed position against seat 46.

Valve 47 prevents the passage of secondary fluid flow through inner passage 15 during a first mode of operation at low engine transient rotor speeds when the pressure of the secondary fluid is insufficient to overcome the forces of spring 48. Preventing or restricting the secondary fluid flow through inner passage 15 is another manner for determining the time response of actuator 10.

More specifically, when the heating of rod 11 by the secondary fluid flow is delayed, longitudinal expansion thereof with respect to the expansion of sleeve 12 is delayed. Thusly, the differential expansion of rod 11 and sleeve 12 is increased which thereby provides an increased time response. However, during a second mode of operation which occurs when the rotor speed reaches a predetermined intermediate value such as can be indicated when the pressure of the secondary fluid reaches a corresponding predetermined value, forces acting on valve 47 due to differential pressure thereacross will cause valve 47 to open, allowing secondary fluid to flow relatively unrestrictedly through inner passage 15 for heating and expanding rod 11 to thereby retract sleeve 12.

In order to limit the extent to which valve 42 can open and thereby control the flow rate of secondary fluid in inner passage 15, a travel limit member 50 is fixedly, or adjustably, connected to and within outer casing 13 at a predetermined distance from the head portion of valve 47. Member 50 comprises a disc having a plurality of circumferentially spaced and axially extending apertures. These apertures allow substantially unrestricted passage of fluid from the outlet end of actuator 10. Travel limit member 50 is appropriately positioned at the mentioned predetermined distance for controlling the secondary fluid flow in any one engine to compensate for the inherent engine thermal transient characteristics therein which lead to transient undershoot errors as above-mentioned.

As shown in FIGS. 1 and 3, means are provided for coupling the output motion of the actuator 10 to an element whose position requires controlling, such as a control cable conduit 51. Such means can take the form of a pair of cooperating levers 52 and 53 which are connected for pivotal movement to the bracket 21 by a pin 54. The operating position of the levers 52 and 53 is controlled by a pair of cooperating pins 55 and 56 which extend through the levers 52 and 53, respectively, and also through the flanged end 30 of the sleeve 12. Movement of the levers 52 and 53 is suitably coupled to the cable conduit 51, as shown in FIG. 3. Thus, axial movement of the sleeve 12 results in axial movement of the cable conduit 51 with the extent of movement of the cable conduit 51 depending upon the length of the levers 52 and 53.

The axial movement of the sleeve 12 is effected as follows: compressor interstage hot air is directed to the interior of the actuator 10 through the opening 17 formed in the thermal shield 13. When valve 47 is closed during the first mode of operation, the hot air comprises a primary air flow passing through only the annular outer passage 14. As the primary hot air passes over the sleeve 12, it causes thermal expansion thereof. Due to the fact that the sleeve 12 is rigidly connected to the rod 11 at the outlet end of the actuator, such thermal expansion results in movement of the flanged end 30 to the left in FIG. 1. This movement causes corresponding movement of the pins 55 and 56 and thus causes pivoting of the levers 52 and 53. This pivoting is in a counterclockwise direction when viewed from the direction shown in FIG. 3. The pivoting, in turn, results in leftward movement of the cable conduit 51. The movement of the cable conduit 51 could, of course, be coupled to any element, the position of which requires controlling.

During the first mode of operation when valve 47 is closed, secondary air flow is restricted in inner passage 15 and therefore rod 11 experiences substantially no thermal expansion which would partially retract and cancel the effect of expanding sleeve 12. Under these conditions, the time response of actuator 10 is at its fastest.

During the second mode of operation, when the pressure of the compressor interstage hot air reaches a predetermined value, sufficient force is thereby exerted on valve 47 to offset the force of spring 48 and open valve 47. When valve 47 opens, a primary flow portion of the hot air passes through the outer passage 14 and a secondary flow portion thereof passes through the inner passage 15.

As mentioned above, the actuator 10 is designed to provide movement to an element in response to the occurrence of some condition in the gas turbine engine with an automatic resetting of the element after a certain time lapse. Resetting of the cable conduit 51 results from the expansion of rod 11 which retracts sleeve 12. More specifically, the secondary flow of hot air in inner passage 15, in addition to causing longitudinal expansion of the sleeve 12, also causes an increase in the temperature and thus the length of rod 11. Due to the fact that rod 11 is rigidly connected to bracket 21, it is constrained to expand only to the right as shown in FIG. 1. As a result of the rigid interconnection of rod 11 and sleeve 12 at the outlet end of actuator 10, the rightward expansion of the rod 11 causes rightward movement and retraction of the sleeve 12.

Furthermore, the final position of the flanged end 30 of the sleeve 12 is the summation of leftward movement caused by the expansion of the sleeve 12 and the rightward movement caused by the expansion of the rod 11. The leftward movement does not necessarily equal the rightward movement; however, should the rod 11 and the sleeve 12 be formed of the same material or of two materials having identical coefficients of thermal expansion and the same effective length, the final position of the flanged end 30 will be identical to its initial position prior to the temperature influence of the hot air passing through the actuator 10. Actuator 10, therefore, can be a self-nulling actuator which is effective for positioning an element in response to the change in temperature of a fluid, and after reaching thermal equilibrium of its components repositioning or retracting the element to substantially its initial position.

The relative differential thermal expansion between sleeve 12 and rod member 11, and thus the response time of actuator 10, is proportional to many variables such as fluid flow temperature, pressure and flow rate, thickness of the members, and the heat transfer properties of the members. For example, the inlet and outlet apertures for the inner and outer passages can be dimensioned for controlling the amount of flow rate through each. Typically, the flow rate in the outer passage 14 is approximately ten times the magnitude of the flow rate through the inner passage 15 and results in greater heating of sleeve 12 with respect to rod 11.

Additionally, the sleeve 12 can be formed of a thin cross-section, e.g., 20 mil thickness tubing. Due to this thin cross-section, and further due to the high velocity primary hot air flowing over the periphery thereof, the sleeve 12 will expand almost simultaneously with the introduction of the hot air to the actuator 10. Due to its greater thickness (relative to that of the sleeve 12) and due to valve 47 being initially in a closed position during the first mode, the expansion of the solid rod 11 will substantially lag the expansion of the sleeve 12.

Referring now to FIG. 4, one use of applicant's actuator is shown in connection with an aircraft gas turbine engine 60. FIG. 4 illustrates in block diagram form those portions of a control system for the gas turbine engine 60 which are employed to regulate the position of compressor inlet stator vanes 61 to optimize the operation of an axial flow compressor 62, normally employed in such a gas turbine engine. Pivoting the stator vanes about a radial axis in such a compressor is a well known technique for controlling air flow in order to optimize compressor operation.

The various stator vanes 61, usually arranged in several stages, are preferably interconnected such that they may be simultaneously pivoted by a hydraulic actuator 63 through a suitable mechanical interconnection. A controller 64 comprising a computer and, in part, a servomechanism, establishes demand signals which feed hydraulic fluid through conduits 65 and 66 to operate the actuator 63 and to move the stator vanes 61 appropriately. A position feedback signal is provided by a mechanical connection, or feedback cable 67 which generates an input of an integrator of a guide vane reset mechanism 68 having an output shaft 69. The output shaft 69 transmits the feedback signal to the controller 64 for nulling the demand signal when the vales 61 have been pivoted to their proper positions.

The above-described system adequately provides for normal engine operation. There are certain conditions, however, that require correction of the angular position of the guide vanes which cannot be conveniently provided for by the controller 64. One of these conditions involves a throttle burst or engine acceleration where engine fluid pressures significantly increase. More specifically, when a new increased throttle setting is made, for example, when the throttle is positioned from an idle setting to a take-off setting, the fan accelerates quickly towards a correspondingly desired increased fan speed. Due to the inherent engine thermal transient characteristics, the fan speed will at first overshoot then undershoot the desired take-off fan speed which can also result in exhaust gas temperature overshoot as well as not providing a desired engine thrust output at the take-off throttle setting. When such a condition exists, it is desired that the stator vanes 61 be scheduled to quickly pivot to a more closed position to reduce the flow of air into the compressor 62 for thereby compensating the overshoot in fan speed. Stator vanes 61 must then open to a less closed position to compensate for the undershoot in fan speed which follows and until such a time that engine thermal transient conditions have passed and compressor interstage temperatures have stabilized.

In order that such a compensation in the air intake may take place, an actuator 10 constructed in accordance with applicant's invention may be provided for scheduling a stator vane position error in the feedback cable 67. The fitting 16 of the actuator 10 is connected by means of a conduit 70 to a source of hot air, e.g., one of the latter stages of the compressor 62. In this manner, an increase in the temperature and pressure of the air within the compressor 62 causes operation of the actuator 10 as described above.

More specifically, during the first mode of operation of actuator 10, substantially only sleeve 12 will expand due to the increase in temperature of the compressor air flowing as primary flow in the outer passage 14. The expansion of sleeve 12 will cause movement of the levers 52 and 53, and cable conduit 51 which cable conduit 51 houses the feedback cable 67 and will result in repositioning of the feedback cable 67.

Due to the fact that substantially only sleeve 12 expands during the first mode, actuator 10 provides a relatively fast response time than that which would occur if rod 11 were allowed to also expand and thereby retract sleeve 12. This relatively fast response time more accurately compensates for the initial overshoot of fan speed. The repositioning causes the controller 64 to activate the hydraulic actuator 63 which in turn repositions the stator vanes 61 to a more closed position. After a short time interval, however, the pressure of the compressor interstage air reaches the predetermined value and causes the poppet valve 47 in actuator 10 to open and thereby allows secondary flow of air to pass through inner passage 15 for heating rod 11. The expansion of the rod member 11 causes repositioning of the feedback cable 67 to its original position which, in turn, causes reopening of the stator vanes 61. In this manner, fan speed overshoot and undershoot due to the throttle burst or engine acceleration, is effectively minimized without the necessity of complicated electrical or electromechanical additions to the overall control system.

While a single embodiment of applicant's actuator has been shown and described, it will be apparent to those skilled in the art after considering applicant's invention, that changes can be made without departing from the broader aspects thereof. For example, valve 47 can be actuated by a temperature responsive bellows or a fluid flow rate responsive actuator which cause valve 47 to open at a predetermined value of temperature or flow rate corresponding to a predetermined intermediate engine speed. Broadly construed, delaying the passage of fluid flow in the outer or inner passages 14 and 15, respectively, can be accomplished with various valve means responsive to engine opearating parameters such as rotor speed and fluid temperature and flow rate, to name but a few. In light of the above, these and other embodiments are intended to be covered by the appended claims which follow.

I claim:
1. A temperature-responsive actuator comprising:
a support member;
a spaced pair of thermally expandable members extending longitudinally in parallel alignment, one of said expandable members having one end fixedly connected to said support member and an opposite end connected to a corresponding end of the other expandable member;
means directing a flow of fluid into contact with both said expandable members; and
means restricting the flow of said fluid into contact with one of said expandable members in a first mode of operation and enabling relatively unrestricted flow of said fluid in contact therewith in a second mode of operation;
whereby said one expandable member expands longitudinally in one direction during said first mode and the other of said expandable members expands longitudinally in an opposite direction during said second mode for retracting said one expandable member.

2. A temperature and pressure-responsive actuator comprising:
   a support member;
   a spaced pair of thermally expandable members extending longitudinally in parallel alignment, one of said expandable members having one end fixedly connected to said support member and an opposite end connected to a corresponding end of the other expandable member;
   means effective for directing a pressurized flow of fluid into contact with both said expandable members; and
   pressure-responsive means restricting the flow of said fluid into contact with one of said expandable members in a first mode of operation wherein the pressure of said fluid is below a predetermined value, and enabling relatively unrestricted flow of said fluid in contact therewith in a second mode of operation wherein the pressure of said fluid is above said predetermined value;
   whereby said one expandable member expands longitudinally in one direction during said first mode, and the other of said expandable members expands longitudinally in an opposite direction during said second mode for retracting said one expandable member.

3. An actuator responsive to the temperature and pressure of a fluid comprising:
   an outer casing having a fluid inlet and a fluid outlet;
   a thermally expandable inner casing having a fluid inlet and a fluid outlet and being coaxially slidably mounted and radially spaced in said outer casing for thereby defining an annular outer passage for fluid from said inlet to said outlet of said outer casing;
   a thermally expandable elongated member positioned coaxially and radially spaced in said inner casing for thereby defining an annular inner passage for fluid between said inlet and outlet of said inner casing;
   means for restraining axial movement of one end of said elongated member and permitting axial movement relative to the corresponding end of said inner casing;
   means connecting the other end of said elongated member to the opposite end of said inner casing;
   means effective for directing a pressurized flow of fluid into both said passages; and
   pressure-responsive means restricting the flow of said fluid through said inner passage in a first mode of operation wherein the pressure of said fluid is below a predetermined value, and enabling relatively unrestricted flow of said fluid through said inner passage in a second mode of operation wherein the pressure of said fluid is above said predetermined value;
   whereby said inner casing expands longitudinally in one direction during said first mode, and said elongated member expands longitudinally in an opposite direction during said second mode for retracting said inner casing.

4. An actuator according to claim 3, wherein said elongated member and said inner casing have substantially equal effective lengths and are constructed of materials having substantially the same coefficient of thermal expansion, whereby the longitudinal expansion of said inner casing substantially equals the longitudinal expansion of said elongated member during said second mode of operation and after a predetermined time period.

5. An actuator according to claim 3, wherein said pressure-responsive means is mounted within said outlet of said inner casing and extends longitudinally in said outer casing.

6. An actuator according to claim 5, wherein said valve assembly comprises a longitudinally movable valve head and a perforate member mounted transversely in said outlet of said outer casing and predeterminedly positioned for controlling movement of said valve head and thereby controlling the rate at which said fluid flows through said inner passage.

7. An actuator for positioning a controllable element in a control system of a gas turbine engine having an axial flow compressor and variable stator vanes, said actuator being responsive to the temperature and pressure of the fluid flowing in said compressor and comprising:
   a cylindrical outer casing having a fluid inlet and a fluid outlet;
   a thermally expandable cylindrical inner casing coaxially slidably mounted and radially spaced in said outer casing for thereby defining an annular outer passage for fluid from said inlet to said outlet of said outer casing, said inner casing being imperforate except for at least one inlet aperture adjacent said inlet of said outer casing for receiving a portion of fluid entering said outer casing, and having an axial outlet for exhausting said fluid;
   a thermally expandable solid rod member positioned coaxially and radially spaced in said inner casing for thereby defining an annular inner passage receiving fluid from said inlet aperture in said inner casing and directing said fluid to said axial outlet of said inner casing, said rod member having a first end fixedly connected to the corresponding end of said outer casing and a second end fixedly connected to a corresponding end of said inner casing;
   means connecting the opposite end of said inner casing to the controllable element and permitting relative axial movement between said inner casing and said rod member; and
   a pressure-actuated, spring-loaded, poppet-valve assembly mounted within said axial outlet of said inner casing and effective for restricting the flow of fluid in said inner passage during a first mode of operation wherein the pressure of said fluid is below a predetermined value, and for allowing relatively unrestricted flow of fluid through said inner passage in a second mode of operation wherein the pressure of said fluid is above said predetermined value;
   wherein said inner casing expands longitudinally in one direction during said first mode for actuating the controllable member, and said rod member expands longitudinally in an opposite direction during said second mode for retraction of said inner casing and said controllable element.

8. A temperature-responsive actuator for a controllable element comprising:
   a cylindrical outer casing having a fluid inlet and a fluid outlet;
   a thermally expandable cylindrical inner casing slidably mounted and radially spaced in said outer casing for thereby defining an annular outer passage for fluid from said inlet to said outlet of said outer casing, said inner casing being imperforate except for a plurality of circumferentially spaced inlet apertures at one end thereof for receiving a portion of said fluid from said inlet of said outer casing, and an axial outlet at the opposite end thereof for exhausting said fluid;

a thermally expandable rod member positioned coaxially and radially spaced in said inner casing for thereby defining an annular inner passage for fluid received through said inlet apertures and directing said fluid to said axial outlet of said inner casing, said rod member having a first end fixedly connected to one end of said outer casing and a second end fixedly connected to an opposite end of said inner casing; and means connecting said one end of said inner casing to the controllable element and permitting relative axial movement between said inner casing and said rod member;

whereby said inner casing expands longitudinally in one direction for actuating the controllable element and said rod member expands longitudinally in an opposite direction for retraction of said inner casing and controllable element.

* * * * *